US011321744B2

(12) United States Patent
Ko

(10) Patent No.: US 11,321,744 B2
(45) Date of Patent: May 3, 2022

(54) VIRAL MARKETING SERVICE PROVIDING SYSTEM FOR DISTRIBUTING ADVERTISEMENT COSTS FOR EACH MARKETER AND FILTERING OUT ABUSING MARKETER BY ANALYZING BEHAVIOR OF CONTENT RECEIVER, AND METHOD THEREFOR

(71) Applicant: TENPING INC., Seoul (KR)

(72) Inventor: Joon Seong Ko, Gyeonggi-do (KR)

(73) Assignee: TENPING INC., Seoul (KR)

( * ) Notice: Subject to any disclaimer, the term of this patent is extended or adjusted under 35 U.S.C. 154(b) by 59 days.

(21) Appl. No.: 16/098,132

(22) PCT Filed: Apr. 3, 2017

(86) PCT No.: PCT/KR2017/003617
§ 371 (c)(1),
(2) Date: Nov. 1, 2018

(87) PCT Pub. No.: WO2017/191901
PCT Pub. Date: Nov. 9, 2017

(65) Prior Publication Data
US 2019/0147497 A1    May 16, 2019

(30) Foreign Application Priority Data

May 4, 2016    (KR) .......................... 10-2016-0055269

(51) Int. Cl.
*G06Q 30/00*    (2012.01)
*G06Q 30/02*    (2012.01)
(Continued)

(52) U.S. Cl.
CPC ......... *G06Q 30/0274* (2013.01); *G06Q 30/02* (2013.01); *G06Q 30/0246* (2013.01);
(Continued)

(58) Field of Classification Search
CPC ..... G06Q 20/0207–0277; G06Q 50/00; G06Q 50/30
See application file for complete search history.

(56) References Cited

U.S. PATENT DOCUMENTS 8,447,656 B2 * 5/2013 Messer .............. G06Q 30/0242
705/26.1
2005/0096988 A1    5/2005 Yanagisawa et al.
(Continued)

FOREIGN PATENT DOCUMENTS

KR      20110046299    5/2011
KR      20110127245    11/2011
(Continued)

OTHER PUBLICATIONS

Alissa Skelton, Get paid for sharing ads on your social networks, Apr. 11, 2012, www.mashable.com (Year: 2012).*
(Continued)

*Primary Examiner* — Naresh Vig
(74) *Attorney, Agent, or Firm* — JCIP Global Inc.

(57) ABSTRACT

Provided are a viral marketing service providing system for distributing advertisement costs for each marketer by analyzing a behavior of a content receiver, and a method therefor. For the viral marketing service for distributing advertisement costs for each marketer, the system comprises a content receiver behavior analyzing unit and a traffic quality index calculating unit, thereby precisely filtering abusing marketers (abusers), and thus can minimize damages to legitimate marketers with good intentions at the time of distributing predetermined advertisement costs. Also, the system can extract, by using a traffic quality index, high quality marketers who generate active behaviors on an advertiser's landing page or start a rumor of contents in a manner which aids in the advertising purpose of an adver- (Continued)

tiser, thereby distributing some of the advertisement costs paid by an advertiser to the marketers at a higher rate than other marketers.

20 Claims, 11 Drawing Sheets

(51) Int. Cl.
*G06Q 50/30* (2012.01)
*G06Q 50/00* (2012.01)
*H04L 29/06* (2006.01)

(52) U.S. Cl.
CPC .............. *G06Q 50/00* (2013.01); *G06Q 50/30* (2013.01); *H04L 63/08* (2013.01)

(56) References Cited

U.S. PATENT DOCUMENTS

| | | | | |
|---|---|---|---|---|
| 2006/0100928 A1* | 5/2006 | Walczak | ............ | G06Q 30/0267 705/14.64 |
| 2007/0106608 A1* | 5/2007 | Khandelwal | ......... | G06Q 20/102 705/40 |
| 2007/0219871 A1* | 9/2007 | Rolf | .................. | G06Q 30/0241 705/14.4 |
| 2011/0131098 A1* | 6/2011 | Bafia | ...................... | G06Q 30/02 705/14.69 |
| 2011/0173056 A1* | 7/2011 | D'Alessio | .......... | G06Q 30/0214 705/14.16 |
| 2012/0047003 A1* | 2/2012 | Hammad | ........... | G06Q 30/0267 705/14.1 |
| 2012/0232973 A1* | 9/2012 | Robb | ..................... | G06Q 50/01 705/14.17 |
| 2014/0019266 A1* | 1/2014 | Stoliartchouk | ........ | G06Q 30/02 705/14.73 |
| 2015/0025950 A1* | 1/2015 | Yu | ..................... | G06Q 30/0274 705/14.7 |
| 2017/0316092 A1* | 11/2017 | Fichter | .................. | G06F 16/958 |
| 2018/0357326 A1* | 12/2018 | Lepeska | ............. | G06F 16/9574 |

FOREIGN PATENT DOCUMENTS

| | | | | |
|---|---|---|---|---|
| KR | 20120094656 | | 8/2012 | |
| KR | 20120137542 | | 12/2012 | |
| KR | 101538278 | | 7/2015 | |
| KR | 101618013 | | 5/2016 | |
| WO | WO-2008026830 A1 * | | 3/2008 | ............. G06Q 30/02 |

OTHER PUBLICATIONS

HTML iframe tag, Apr. 20, 2016, www.w3schools.com, printed through www.archive.org (Year: 2016).*

Information on VigLink, 2016, www.VigLink.com, archived web pages printed through www.archive.org, date is in the URL in YYYYMMDD format (Year: 2016).*

TinyURL, Mar. 21, 2016, www.wikipedia.com, printed through www.archive.org, date is in the URL in YYYYMMDD format (Year: 2016).*

Click-Through Rate (CTR), www.worldstream.com, Jan. 31, 2016, printed through www.archive.org, date is in the URL in YYYYMMDD format (Year: 2016).*

Lepeska et al. U.S. Appl. No. 62/211,246, Aug. 28, 2015 (Year: 2015).*

Magwood published article "Viral Marketing and Affiliate Marketing To Boost Sales", 2013, www.warriorforum.com (Year: 2013).*

Warner et al., Spammer success through customization and randomization of URLs, 2015, IEEE (Year: 2015).*

Ivkovic et al., Affiliate Internet Marketing Concept and Application Analysis, 2010, IEEE (Year: 2010).*

"International Search Report (Form PCT/ISA/210)", dated Jul. 10, 2017, with English translation thereof, pp. 1-4.

"Search Report of Europe Counterpart Application", dated Nov. 25, 2019, p. 1-p. 8.

Zied Ben Houidi et al., "Gold Mining in a River of Internet Content Traffic", Lecture Notes in Computer Science, vol. 8406, Apr. 14, 2014, pp. 91-103.

* cited by examiner

[FIG1]
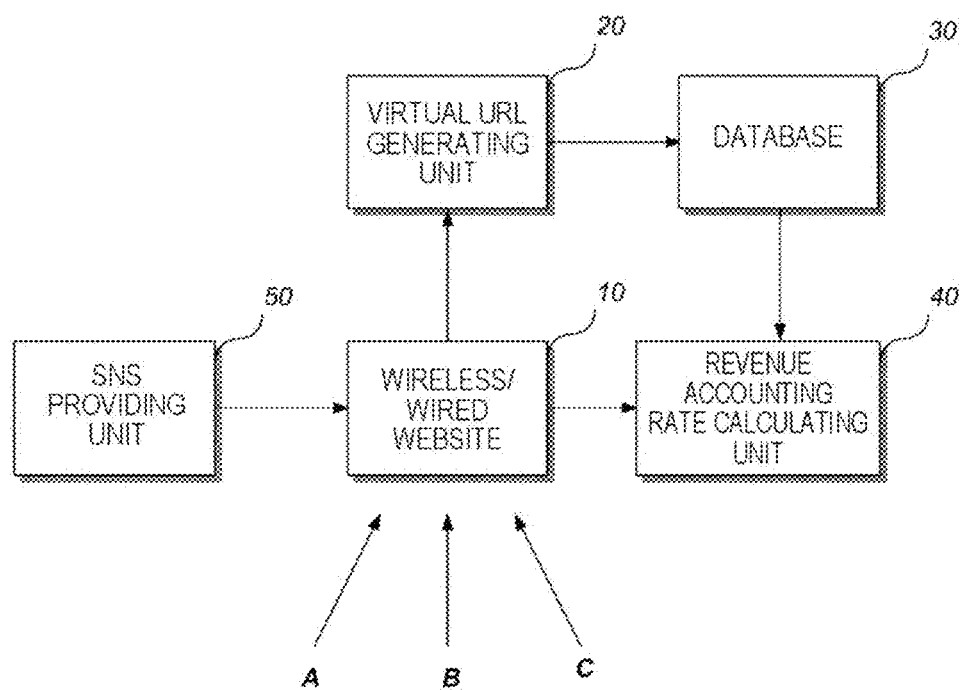

[FIG2]
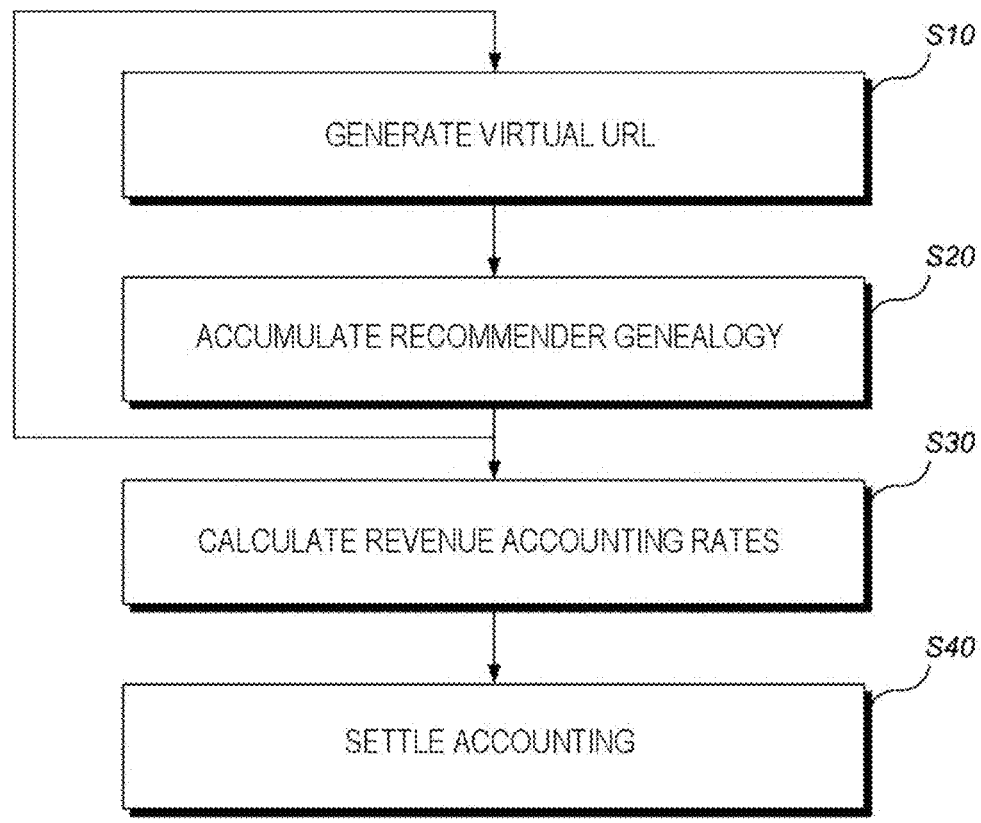

[FIG3]
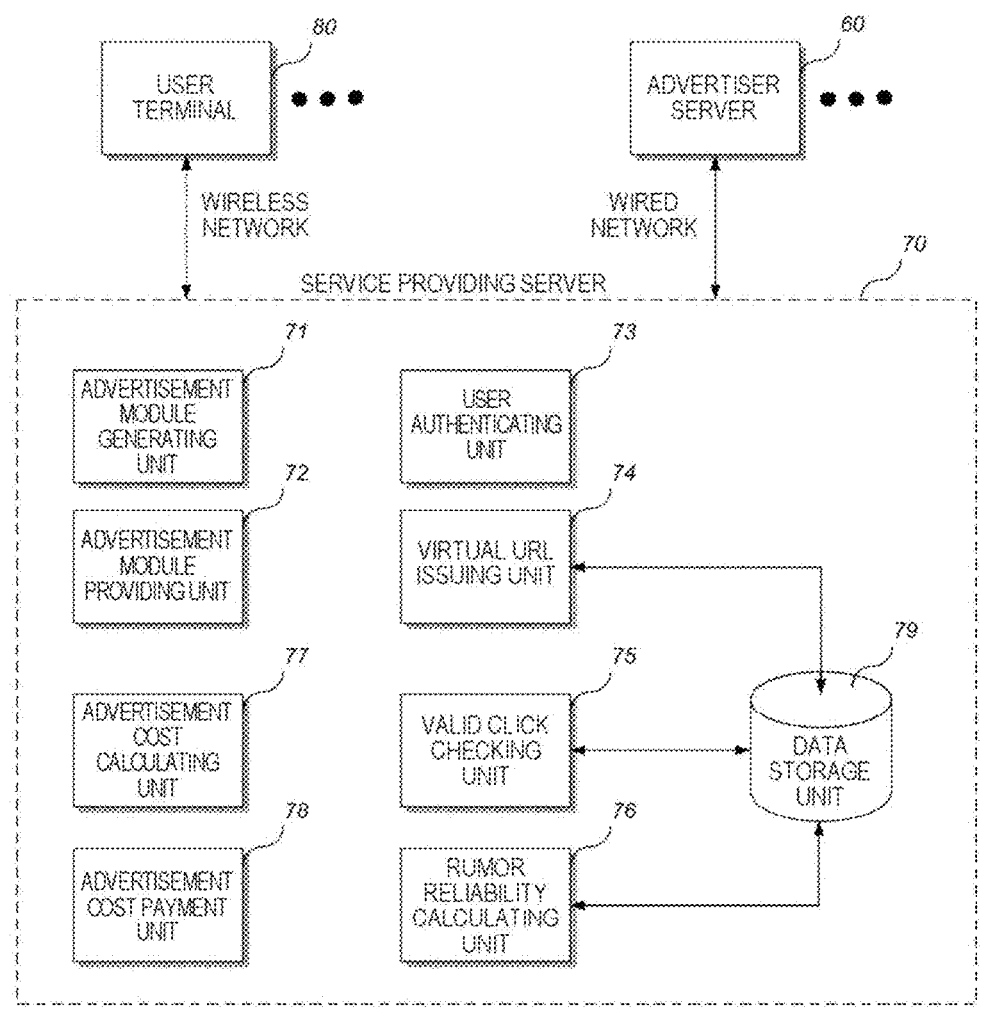

[FIG4]
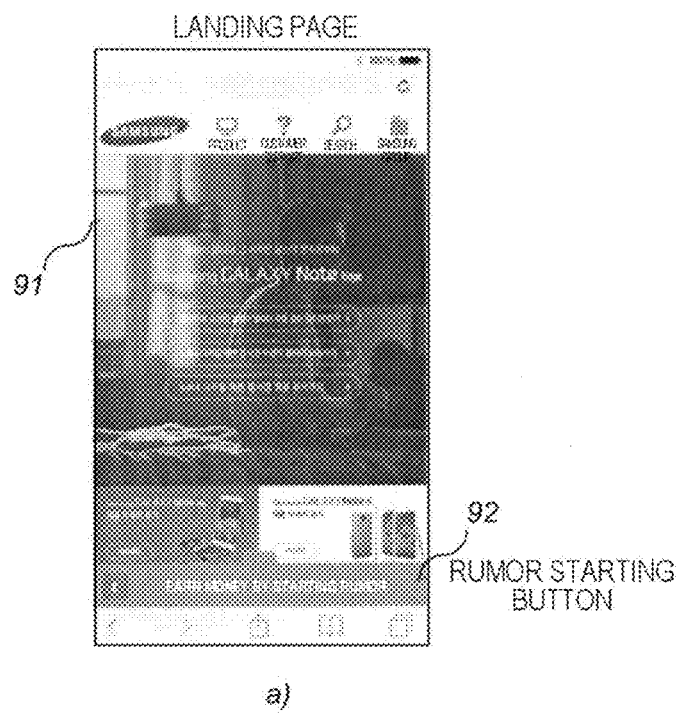
a)
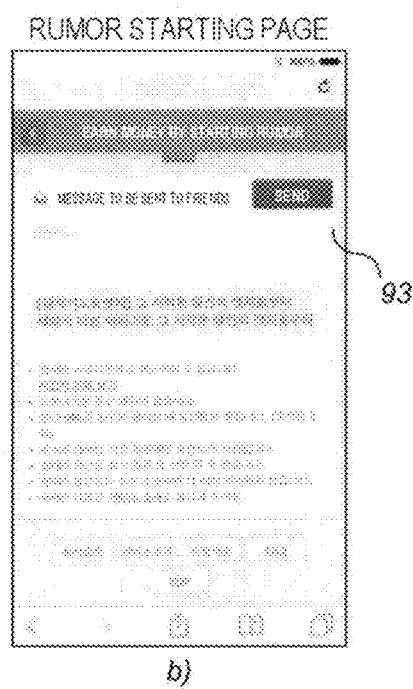
b)

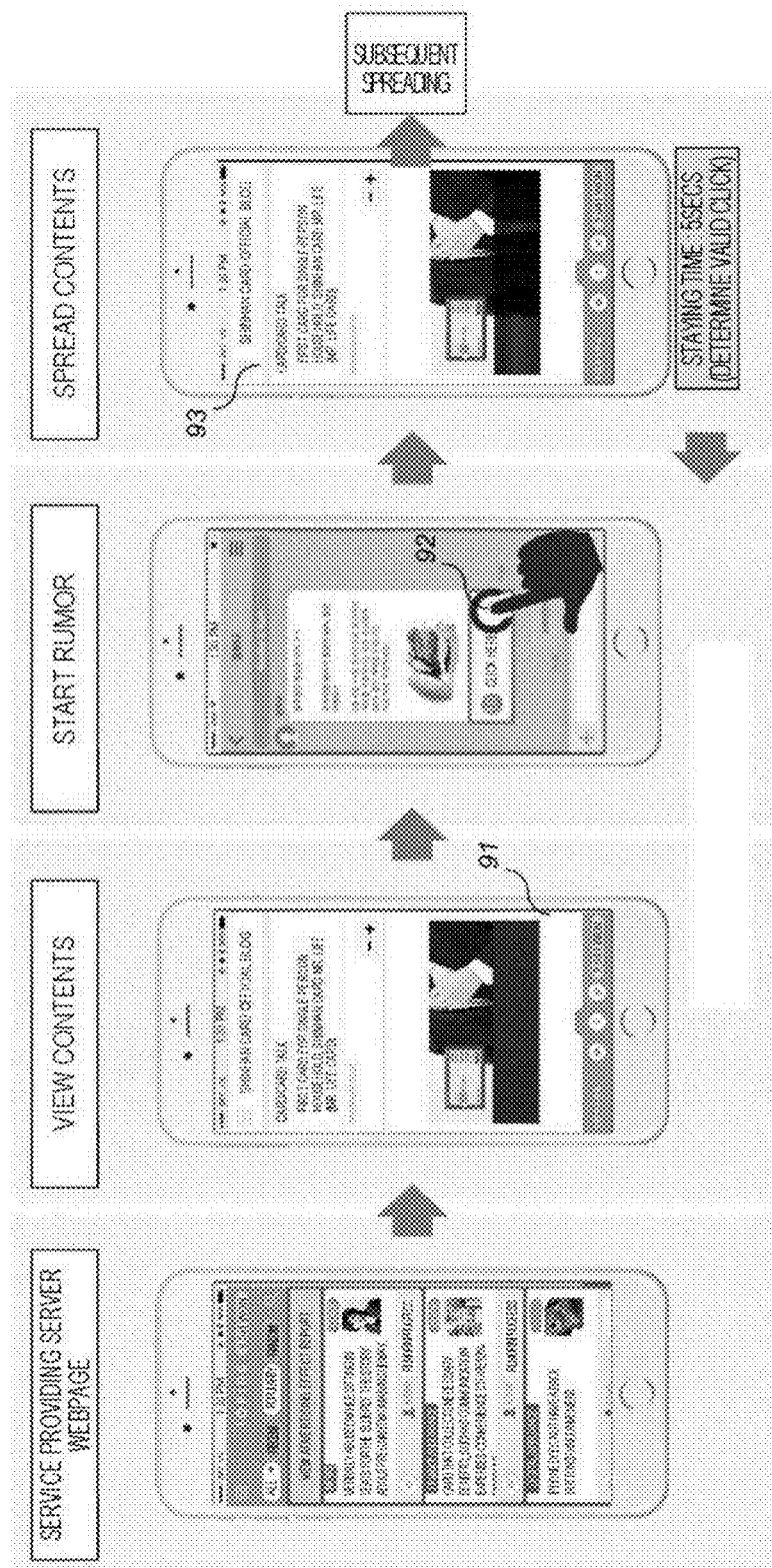

[FIG6]
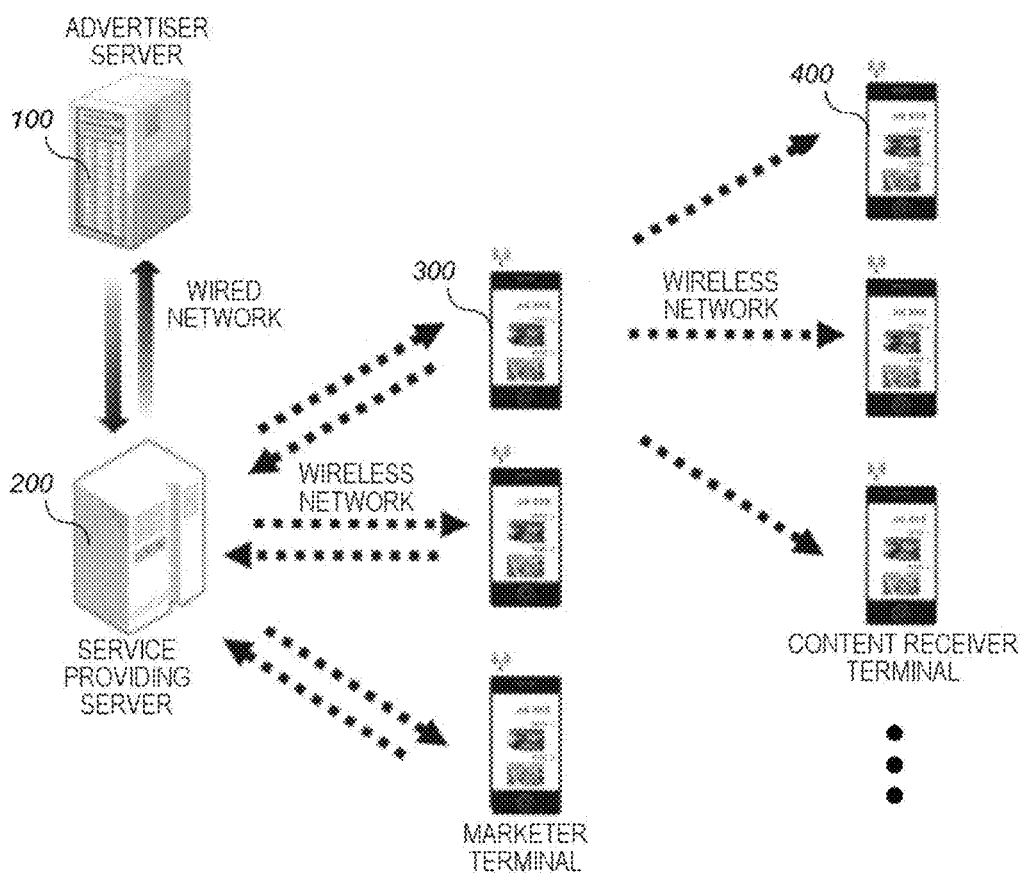

[FIG7]
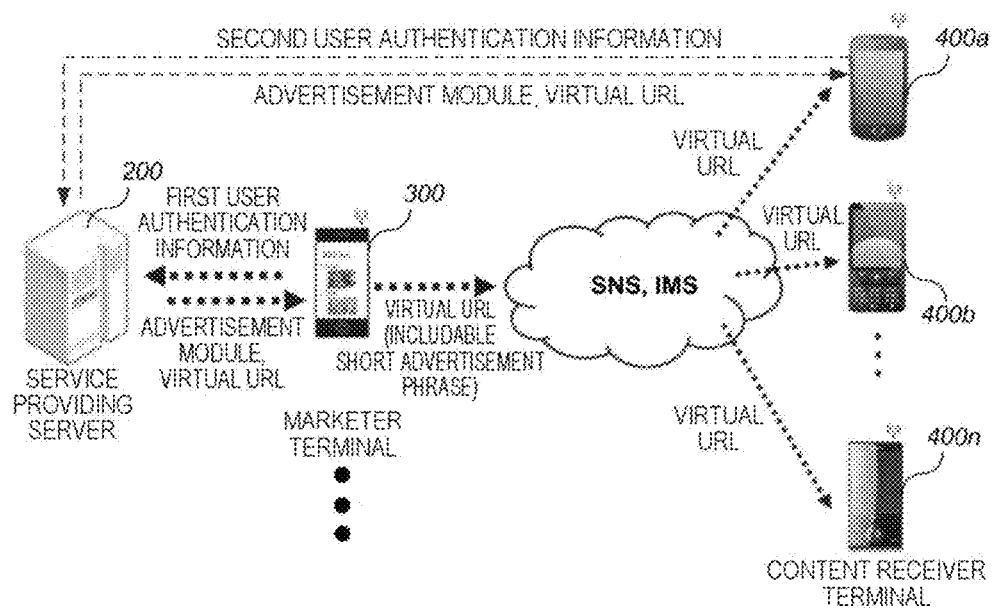

[FIG8]
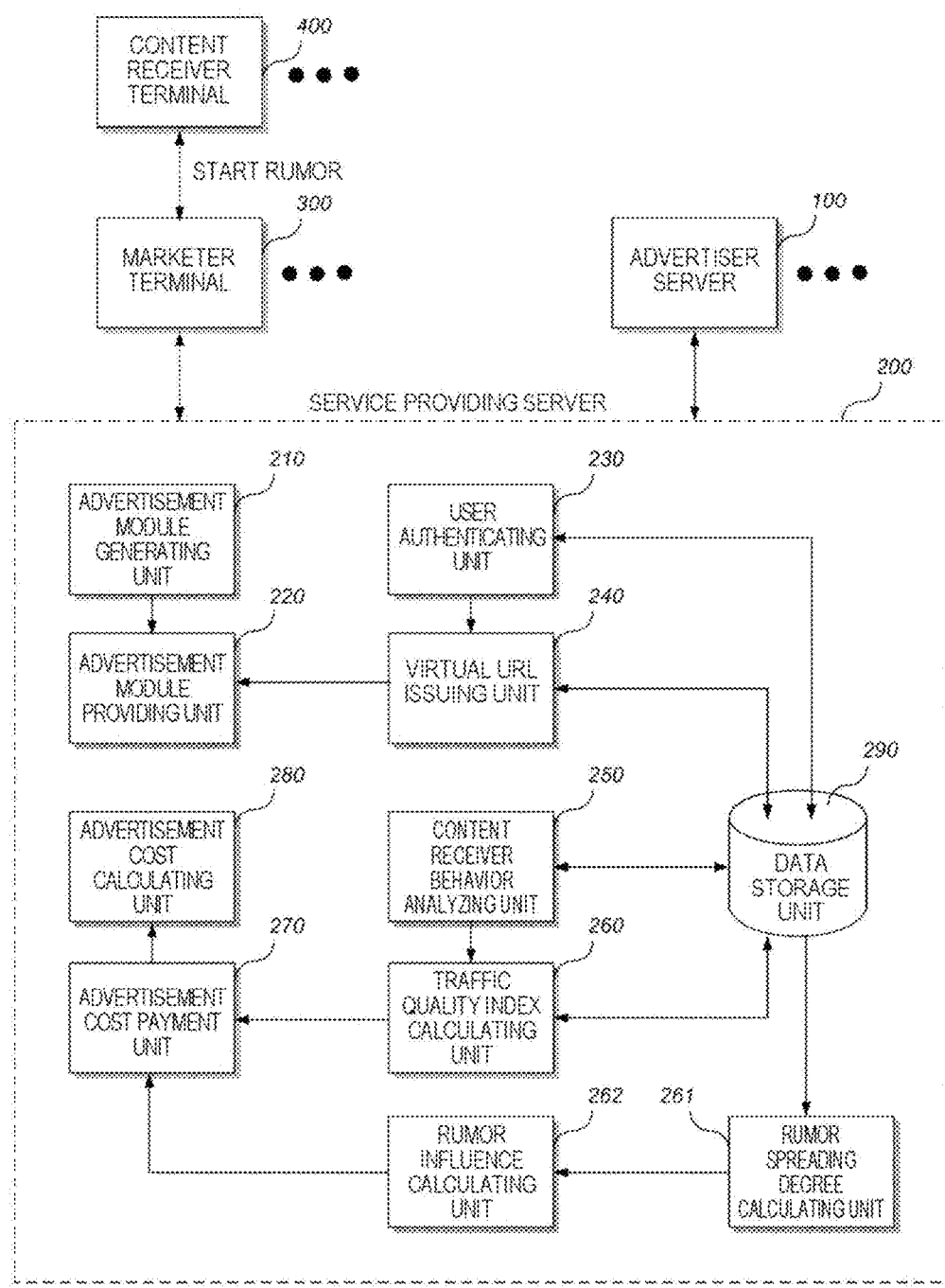

[FIG9]

[FIG10]
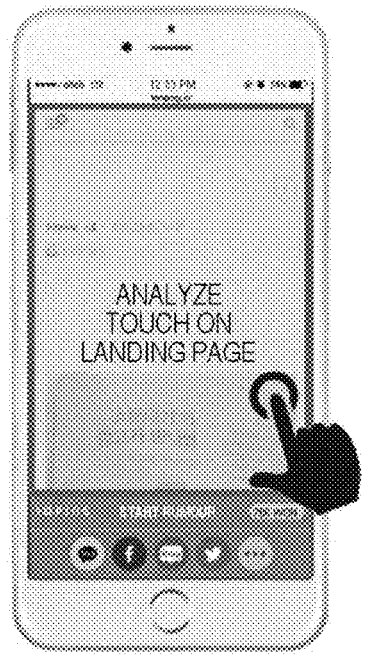
a)
b)
c)
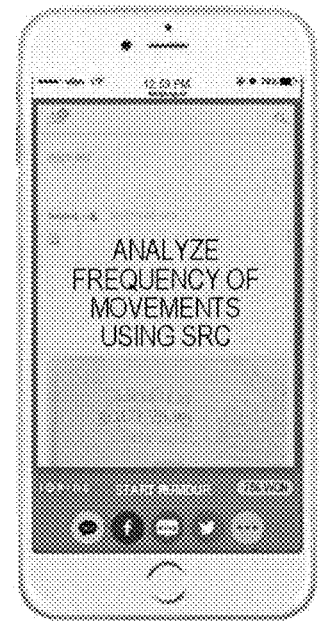
d)

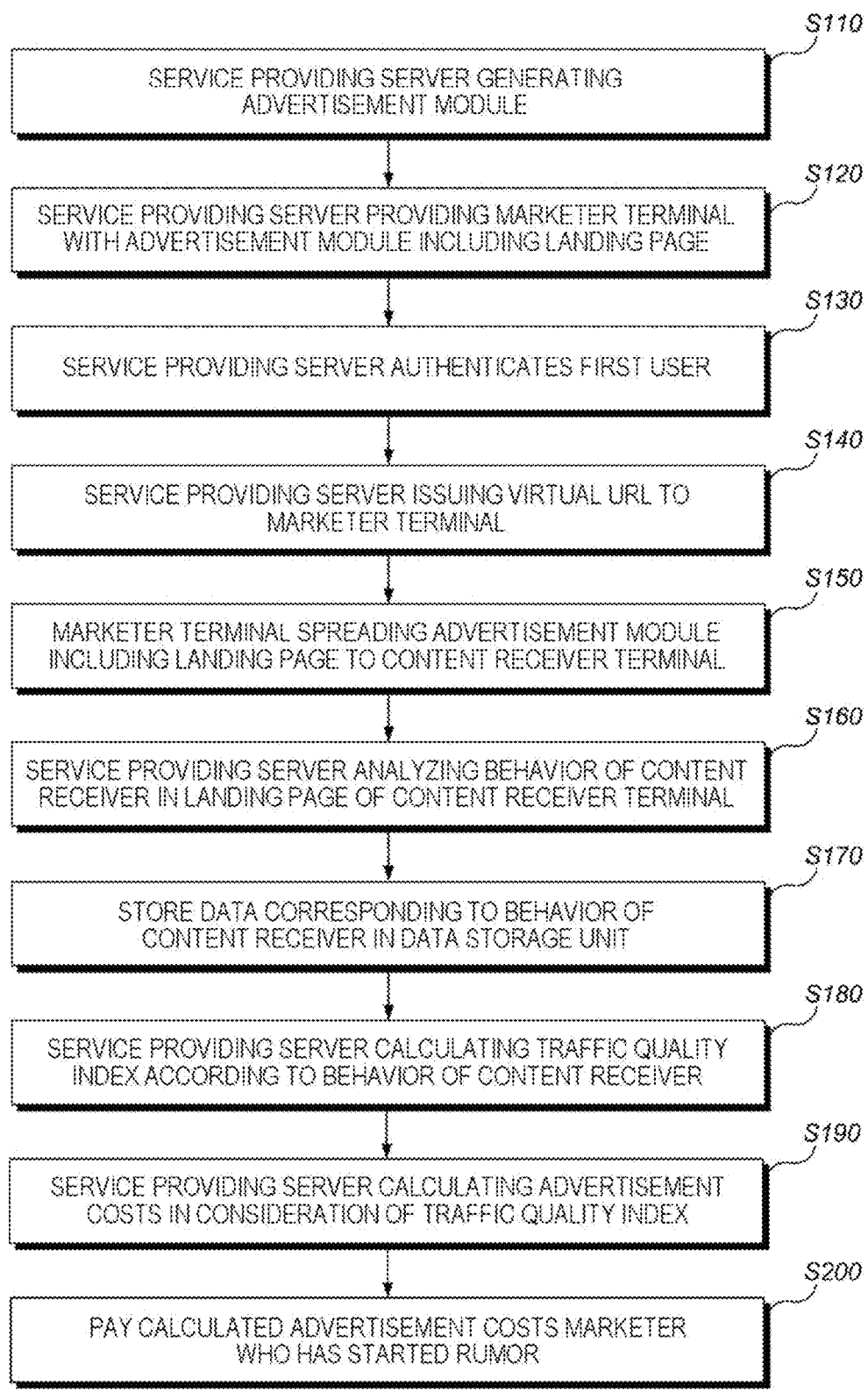
[FIG11]

VIRAL MARKETING SERVICE PROVIDING SYSTEM FOR DISTRIBUTING ADVERTISEMENT COSTS FOR EACH MARKETER AND FILTERING OUT ABUSING MARKETER BY ANALYZING BEHAVIOR OF CONTENT RECEIVER, AND METHOD THEREFOR

CROSS-REFERENCE TO RELATED APPLICATION

This application is a 371 application of the international PCT application serial no. PCT/KR2017/003617, filed on Apr. 3, 2017, which claims the priority benefit of Korean application no. 10-2016-0055269, filed on May 4, 2016. The entirety of each of the abovementioned patent applications is hereby incorporated by reference herein and made a part of this specification.

TECHNICAL FIELD

The present invention relates to a viral marketing service providing system, and more specifically, to a viral marketing service providing system for distributing advertisement costs for each marketer by analyzing a behavior of a content receiver, in which the marketer spreads an advertiser's landing page to the content receiver, which is capable of analyzing the behavior of the content receiver in the advertiser's landing page, determining a traffic quality index on the basis of the analyzed behavior, and distributing advertisement costs for each marketer, and a method therefor.

BACKGROUND ART

Recently, with the development of Internet technology through wired/wireless networks, advertisements using Internet media are of more interest to advertisers and users than the existing advertisements using voice or video media, such as a radio or a television.

Such an advertisement using Internet media may be provided not only to a personal desktop computer or notebook computer but also to a portable mobile device. The early advertisements through Internet media have simply showed a corresponding advertisement page, but recently, with the appearance of a system and program for providing a social network service (SNS), there is an increasing use of a viral marketing method that is based on such a system and program and which operates in a similar way as offline.

The viral marketing is a marketing strategy that allows an Internet user to voluntarily promote a business or a product of a business through spreadable media, such as an email, a messenger service, or blog, and thus is called viral marketing due to the characteristic of being spread like a computer virus and broadly used with the meaning of word of mouth marketing.

In detail, the viral marketing differs from the existing advertisement unilaterally delivered to consumers in that an advertisement is delivered by word of mouth through consumers without a business directly conducting a promotion and has a marketing method in which advertisement contents are delivered by Internet users who encounter a product or advertisement of an advertiser between each other through naturally bringing up a topic on the Internet.

In addition, since the viral marketing costs much less than the existing media advertisements using a film, such as a television, a movie, and the like, the use of viral marketing is becoming proliferating in the advertisement market. For example, the viral marketing has become more active in the Internet communities through social network services (SNS), such as Facebook, Twitter, KakaoStory, and the like, or through instant messenger services used on the Internet, such as KakaoTalk, Line, and the like.

Meanwhile, some advertisements based on the viral marketing use an incentive approach (a reward or compensation method) that provides a reward to a person who introduces product information, and a currently used reward system for viral marketing provided through an SNS is calculated simply based on data, such as the number of clicks of users or the number of visits of users, thus creating a difficulty in distributing advertisement costs to users on a precise reward criterion. In addition, due to a difficulty in clearly distinguishing abusing users from users having a high loyalty, the users with an actual high loyalty may avoid using the services.

Meanwhile, as a prior art for solving the above described limitations, there is disclosed Korean Patent Unexamined Publication No. 2011-46299 filed by the applicant of the present invention, titled "Revenue Accounting System on the Internet Using Virtual (Short) URLs Including Genealogy Data of Recommenders." The disclosure will be described with reference to FIGS. 1 and 2.

FIG. 1 is a block diagram illustrating a revenue accounting system on the Internet through generation of a virtual Uniform Resource Locator (URL) and cumulative recommender genealogy data according to a related art.

Referring to FIG. 1, the revenue accounting system on the Internet through generation of a virtual URL and recommender genealogy cumulative data according to the related art includes a virtual URL generating unit 20, a database 30, a revenue accounting rate calculating unit 40, and an SNS providing unit 50.

The virtual URL generating unit 20 issues a first virtual URL to a first user of a wireless/wired website including a mobile web on a wireless Internet for product purchase or sales, a mobile application on a wireless Internet, a widget on a wireless/wired Internet 10, or a website on a wireless/wired website.

In the SNS providing unit 50, the first user who has been issued with a first virtual URL performs a promotion through the first URL.

The database 30 generates a data schema including the first virtual URL, information about the first user, and a generation date and provides the generated data schema.

The revenue accounting rate calculating unit 40 assigns accounting rates to users included in the data stored in the database 30.

When a first user accesses a wireless/wired website through a first virtual URL in the SNS providing unit 50, the virtual URL generating unit issues the first virtual URL to the first user, and in this case, the database generates a data schema including the first virtual URL, information about the first user, and a generation date. In addition, when an $N^{th}$ user accesses the wired/wireless website through a $(N-1)^{th}$ virtual URL in the SNS providing unit 50, the virtual URL generating unit 20 issues an $N^{th}$ virtual URL to the $N^{th}$ user, and the database 30 further generates a data schema including the $N^{th}$ virtual URL, information about the $N^{th}$ user, information about a $(N-1)^{th}$ user to a second user, the information about the first user, and a generation date and provides the generated data schema.

The revenue accounting rate calculating unit 40 assigns accounting rates according to a priority of the $N^{th}$ user, the $(N-1)^{th}$ user to the second user, and the first user included in the data schema.

FIG. 2 is an operation flowchart showing a revenue accounting method on the Internet through generation of a virtual URL and recommender genealogy cumulative data according to the related art.

Referring to FIG. 2, the revenue accounting method on the Internet through generation of a virtual URL and recommender genealogy cumulative data according to the related art first issues a first virtual URL to a first user who purchases a product or participates in an event on a wireless/wired website through the virtual URL generating unit 20 (S10).

Then, when the first user having been issued with the first virtual URL performs a promotion through the first virtual URL in the SNS providing unit 50, the database 30 generates a data schema including the first virtual URL, information about the first user, and a generation date and provides the generated data schema (S20).

Then, when an $N^{th}$ user accesses an online purchase site through a $(N-1)^{th}$ virtual URL in the SNS providing unit 50, the virtual URL generating unit 20 issues an $N^{th}$ virtual URL to the N user, and the database 30 further generates a data schema including the $N^{th}$ virtual URL, information about the $N^{th}$ user, information about a $N-1^{th}$ user to a second user, information about the first user, and a generation date and provides the generated data schema (S30).

Then, the revenue accounting rate calculating unit 40 assigns accounting rates according to the priority of the $N^{th}$ user, the $(N-1)^{th}$ user to the second user, and the first user who are included in the data schema (S40).

According to the revenue accounting system and method on the Internet through generation of a virtual URL and recommender genealogy cumulative data according to the related art, the generation of the virtual URL and the genealogy of the recommenders are accumulated and are converted into a level of contribution for advertisement, the sales revenue of the products is paid to recommenders according to the level of contribution for advertisement, and a weight is put on the order of recommender genealogy such that recommenders are motivated to be engaged with the advertisement activity earlier than others, thereby obtaining a more efficient advertisement effect compared to the existing advertisement methods.

Meanwhile, as another prior art for solving the above described limitations, there is disclosed Korean Patent Publication No. 10-1538278 filed by the applicant of the present invention, titled "System and Method for Providing Viral Marketing Service." The disclosure will be described with reference to FIGS. 3 to 5.

FIG. 3 is a block diagram illustrating a viral marketing service providing system according to the related art.

Referring to FIG. 3, the viral marketing service providing system according to the related art largely includes an advertiser terminal 60, a service providing server 70, and a user terminal 80, and the service providing server 70 includes an advertisement module generating unit 71, an advertisement module providing unit 72, a user authenticating unit 73, a virtual URL issuing unit 74, a valid click checking unit 75, a rumor reliability calculating unit 76, an advertisement cost calculating unit 77, an advertisement cost payment unit 78, and a data storage unit 79.

The advertisement module generating unit 71 of the service providing server 70 generates an advertisement module, and the advertisement module providing unit 72 provides a first user terminal 80 with the generated advertisement module together with an advertiser's landing page.

The user authenticating unit 73 of the service providing server 70 authenticates the first user, and the virtual URL issuing unit 74 issues a virtual URL to the authenticated first user.

The valid click checking unit 75 of the service providing server 70 checks a valid click among activities of second users for whom a rumor is started in the advertiser's landing page, and the data storage unit 79 records and stores the virtual URL, the types of activities of the user, and activity data. Here, the first user is a user who is issued with a virtual URL first from the service providing server 70 and may start a rumor of the virtual URL through various SNSs or instant messenger services (IMSs) together with a short advertisement phrase, if necessary, and another user having received the rumor from the first user becomes a second user.

Accordingly, the second users having clicked on the virtual URL sent from the first user perform various activities in the advertiser's landing page with the advertisement module. For example, the activities include an activity of opening the advertiser's landing page by clicking on the virtual URL, an activity of simply staying on the landing page, an activity of viewing a product or an advertisement phrase in the landing page, an activity of signing up for a membership in the landing page, an activity of purchasing a product in the landing page, and the like, also including an activity of downloading an app when the advertiser is an app-related company.

By investigating the activities, the valid click checking unit 75 checks the total number of clicks among the activities of the second users and extracts the number of valid clicks among the total number of clicks. In detail, the valid click checking unit 75 extracts the total number of clicks among activities of the second users and extracts the number of clicks determined by the advertiser to be valid as the number of valid clicks. In this case, the total number of clicks is the sum of the number of clicks performed by the second users who open the advertiser's landing page by clicking on the virtual URL sent by the first user. Among the total number of clicks, the number of valid clicks is determined depending on whether the time of staying in the advertiser's landing page falls within a predetermined range and whether performance activities of the second users desired by the advertiser have occurred among the activities of the second users.

Referring again to FIG. 3, the rumor reliability calculating unit 76 of the service providing server 70 calculates the reliability of a rumor of users according to the total number of clicks and the number of valid clicks using the stored types of activities and activity data of the users. Here, the reliability of a rumor is a value obtained by calculating, when a virtual URL issued to the first user is spread to second users through viral marketing or a word of mouth, the degree to which the word of mouth has brought a valid effect in association with the advertisement, and the reliability of a rumor refers to an index or value for identifying the degree to which the first user, who is a starter of the rumor, has a reliability regarding the viral marketing or word of mouth while the vial marketing is in progress.

The advertisement cost calculating unit 77 of the service providing server 70 calculates the advertisement cost distribution rates through the calculated reliability of the rumor, and pays advertisement costs to users who have triggered valid clicks according to the calculated rates.

FIG. 4 is a view illustrating a user terminal screen that displays an advertisement module including an advertiser's landing page through a service providing server and a user terminal screen converted when a rumor starting button is clicked in the viral marketing service providing system according to the related art, and FIG. 5 is a view for describing a viral marketing service process according to the related art.

Referring to FIG. 4A, a first user who participates in viral marketing through an advertisement list provided by the service providing server 70 receives an advertisement module, which includes an advertiser's landing page 91 and a rumor starting function, provided from the service providing server 70 to a user terminal 80, and when the first user clicks on a rumor starting button 92 for performing the rumor starting function, the advertisement module is converted to a rumorstarting page 93 capable of performing the rumor starting function as shown in FIG. 7B. At this time, a brief description message to be sent to second users may be written through the converted rumor starting page 90, and the first user, i.e., an initial starter of whom user authentication is completed, is issued with a virtual URL.

Then, the rumor is started through an SNS or IMS selected to be used for starting the rumor, and second users having received the virtual URL determine whether to start the rumor or perform a valid activity in the landing page, and the number of valid clicks is extracted from the valid activities such that advertisement cost distribution rates are calculated for each user, and the advertisement costs are paid.

Referring to FIG. 5, the viral marketing service according to the related art includes checking an advertiser's landing page, checking contents, and performing rumor starting and content spreading in the service providing server web page, and for example, an elapse of five seconds of stay is determined to be a valid click. That is, the viral marketing service providing service according to the related art includes generating, by the service providing server, an advertisement module and providing the generated advertisement module to a user terminal through a wireless/wired network, triggering, by a user, valid clicks in the advertiser's landing page through the advertisement module, and distributing advertisement costs to the users according to a reliability of a rumor calculated according to the valid clicks.

According to the viral marketing service providing service described above, users participating in the viral marketing are paid advertisement costs on a precise basis that depends on the level of contribution to which the user contributes in the marketing and the influence in the subsequent step and thus have a higher satisfaction compared to when participating in the other existing viral marketing, the user having been paid the advertisement costs as such actively induces other users to perform advertisement, and in addition, the advertiser is provided with a viral marketing service that is systemized and has a low cost other than the existing search-based advertisement.

However, the viral marketing service providing system according to the related art is implemented in a way such that the valid click checking unit 75 may check the total number of clicks among the activities of the second users and extract the number of valid clicks among the total number of clicks, thus having a difficulty in filtering out an abusing marketer (an abuser) who has a behavior of loading the advertiser's web page in a mechanically repeating manner or triggering a click using a title that is not related to the purpose of the advertiser's advertisement to degrade the advertising effect, and thus causing damage to legitimate marketers in distributing predetermined advertisement costs.

DISCLOSURE

Technical Problem

The present invention is directed to providing a viral marketing service providing system for distributing advertisement costs for each marketer by analyzing a behavior of a content receiver and a method therefor, which is capable of filtering out an abusing marketer (abuser) and thus minimizing damage to legitimate marketers in distributing predetermined advertisement costs by including a content receiver behavior analyzing unit and a traffic quality index calculating unit.

The present invention is directed to providing a viral marketing service providing system for distributing advertisement costs for each marketer by analyzing a behavior of a content receiver and a method therefor, which is capable of extracting a high quality marketer who generates active behavior in an advertiser's landing page or starts a rumor of contents in a manner which aids in the advertising purpose of an advertiser using a traffic quality index.

Technical Solution

One aspect of the present invention provides a viral marketing service providing system for distributing advertisement costs for each marketer by analyzing a behavior of a content receiver in which a service providing server includes a content receiver behavior analyzing unit and a traffic quality index calculating unit and thus an abusing marketer (abuser) is filtered out and damage to legitimate marketers is minimized in distributing predetermined advertisement costs, and a high quality marketer who generates an active behavior in an advertiser's landing page or starts a rumor of contents in a manner which aids in the advertising purpose of an advertiser is extracted using a traffic quality index and some of advertisement costs paid by the advertiser are distributed to the high quality marketer at a higher rate than other marketers, and a method therefor.

Advantageous Effects

As is apparent from the disclosure, an abusing marketer (abuser) can be precisely filtered out and damage to legitimate marketers in distributing predetermined advertisement costs can be minimized by including a content receiver behavior analyzing unit and a traffic quality index calculating unit.

A high quality marketer who generates an active behavior in the advertiser's landing page or starts a rumor of contents in a manner which aids in the advertising purpose of the advertiser can be extracted using a traffic quality index and thus some of advertisement costs paid by the advertiser can be distributed to the high quality marketer at a higher rate than other marketers.

DESCRIPTION OF DRAWINGS

FIG. 1 is a block diagram illustrating a revenue accounting system on the Internet through generation of a virtual Uniform Resource Locator (URL) and recommender genealogy cumulative data according to the related art.

FIG. 2 is an operation flowchart showing a revenue accounting method on the Internet through generation of a virtual URL and recommender genealogy cumulative data according to the related art.

FIG. 3 is a block diagram illustrating a viral marketing service providing system according to the related art.

FIG. 4 is a view illustrating a user terminal screen that displays an advertisement module including an advertiser's landing page through a service providing server and a user terminal screen converted when a rumor starting button is clicked in the viral marketing service providing system according to the related art.

FIG. 5 is a view illustrating a viral marketing service process according to the related art.

FIG. 6 is a schematic block diagram illustrating a viral marketing service providing system for distributing advertisement costs for each marketer by analyzing a behavior of a content receiver according to an embodiment of the present invention.

FIG. 7 is a block diagram illustrating a viral marketing advertisement conducted on the basis of a marketer terminal, which corresponds to a first user, through a service providing server in the viral marketing service providing system for distributing advertisement costs for each marketer by analyzing a behavior of the content receiver according to an embodiment of the present invention.

FIG. 8 is a block diagram illustrating the viral marketing service providing system for distributing advertisement costs for each marketer by analyzing a behavior of a content receiver according to the embodiment of the present invention.

FIG. 9 is a diagram illustrating a state in which a content receiver terminal is moved to a marketer's landing page after receiving a rumor in the viral marketing service providing system for distributing advertisement costs for each marketer by analyzing a behavior of a content receiver according to the embodiment of the present invention.

FIG. 10 is an example diagram illustrating an analysis on a behavior of a content receiver in the viral marketing service providing system for distributing advertisement costs for each marketer by analyzing a behavior of a content receiver according to the embodiment of the present invention.

FIG. 11 is an operation flowchart showing a viral marketing service providing method for distributing advertisement costs for each marketer by analyzing a behavior of a content receiver according to an embodiment of the present invention.

BEST MODE OF THE INVENTION

One aspect of the present invention is provided as follows.

A viral marketing service providing system for distributing advertisement costs for each marketer by analyzing a behavior of a content receiver includes: an advertiser server configured to provide an advertiser's landing page as content; a service providing server configured to provide a viral marketing service through a wireless/wired network for data transmission and reception and provide the advertiser's landing page to be included in an iframe on a constructed web page; a marketer terminal corresponding to a first user terminal carried by a marketer who participates in viral marketing and configured to select and spread the advertiser's landing page by accessing the service providing server; and a content receiver terminal corresponding to a second user terminal carried by a content receiver who participates in viral marketing and configured to receive the advertiser's landing page spread through the marketer terminal as content, wherein the service providing server is configured to evaluate, among behaviors of content receivers who enter the advertiser's landing page according to a rumor from a marketer who is a first user, a traffic quality index of traffic that is generated by the marketer who starts the rumor of the advertiser's landing page by comprehensively analyzing and evaluating whether the content receiver touches or clicks on a screen, how many seconds the content receiver stays on the landing page, and how many times the content receiver moves from the advertiser's landing page in the iframe to another page, and configured to distribute advertisement costs for each marketer according to the evaluated traffic quality index.

Another aspect of the present invention is provided as follows.

A viral marketing service providing method for distributing advertisement costs for each marketer by analyzing a behavior of a content receiver includes the steps of: a) generating, by a service providing server, an advertisement module including an advertiser's landing page and providing a marketer terminal, which is a first user terminal, with the generated advertiser's landing page; b) authenticating, by the service providing server, a first user carrying the marketer terminal as a marketer; c) issuing, by the service providing server, a virtual Uniform Resource Locator (URL) to the authenticated marketer terminal; d) spreading, by the marketer terminal, the advertisement module including the landing page to a content receiver terminal through a rumor starting; e) analyzing, by the service providing server, a behavior of a content receiver in the landing page of the content receiver terminal; f) storing data corresponding to the behavior of the content receiver in a data storage unit; g) calculating, by the service providing server, a traffic quality index according to the behavior of the content receiver; h) calculating, by the service providing server, an advertisement cost in consideration of the traffic quality index; and i) paying the calculated advertisement costs to marketers having started rumors, wherein in the step e), the service providing server is configured to comprehensively analyze and evaluate, among behaviors of content receivers who enter the advertiser's landing page according to a rumor from a marketer who is a first user, whether the content receiver touches or clicks on a screen, how many seconds the content receiver stays on the landing page, and how many times the content receiver moves from the advertiser's landing page in an iframe to another page, and in the step g), the service providing server calculates a traffic quality index of a traffic generated by the marketer who has started a rumor of the advertiser's landing page.

Modes of the Invention

Hereinafter, exemplary embodiments of the present invention will be described in detail with reference to the accompanying drawings so that those skilled in the art may easily carry out the present invention. The present invention may be embodied in various ways and is not to be construed as limited to the embodiments set forth herein. In the drawings, parts irrelevant to the description have been omitted for clarity of explanation, and the same reference numerals are used to designate the same elements through the whole specification.

Throughout the entire specification, 'include' or 'comprise' should be interpreted as that other components may further be included, not excluded, unless otherwise specified. The term '-unit', '-or(er)', 'module', etc. signifies at least one function or operation processing unit that can be implemented in hardware, software, or a combination thereof.

First, the disclosure of Korean Patent Publication No. 10-1538278 filed by the applicant of the present invention, titled "System and Method for Providing Viral Marketing Service" as described above is incorporated herein by reference, and the present invention is characterized in that a service providing server includes a content receiver behavior analyzing unit and a traffic quality index calculating unit, thus filtering out an abusing marketer (an abuser), minimizing damage to legitimate marketers in distributing predetermined advertisement costs, and also extracting a high quality marketer, who generates an active behavior in the advertiser's landing page or starts a rumor of contents in a manner which aids in the advertising purpose of the advertiser using a traffic quality index, to thereby distribute some of advertisement costs paid by the advertiser to the high quality marketer at a higher rate than other marketers.

Hereinafter, a viral marketing service providing system for distributing advertisement costs for each marketer by analyzing a behavior of a content receiver according to an embodiment of the present invention will be described in detail with reference to FIGS. 6 to 10, and a viral marketing service providing method for distributing advertisement costs for each marketer by analyzing a behavior of a content receiver according to an embodiment of the present invention will be described in detail with reference to FIG. 11.

[A Viral Marketing Service Providing System for Distributing Advertisement Costs for Each Marketer]

FIG. 6 is a schematic block diagram illustrating a viral marketing service providing system for distributing advertisement costs for each marketer by analyzing a behavior of a content receiver according to an embodiment of the present invention, and FIG. 7 is a block diagram illustrating a viral marketing advertisement conducted on the basis of a marketer terminal, which is a first user, through a service providing server in the viral marketing service providing system for distributing advertisement costs for each marketer by analyzing a behavior of a content receiver according to the embodiment of the present invention.

Referring to FIG. 6, the viral marketing service providing system for distributing advertisement costs for each marketer by analyzing a behavior of a content receiver according to the embodiment of the present invention largely includes a service providing server 200, a marketer terminal 300, and content receiver terminals 400, i.e., 400a to 400n, and is configured to transmit and receive various signals or data in a wired or wireless manner in connection with a wired/wireless network.

An advertiser terminal 100 provides an advertiser's landing page as content.

The service providing server 200 provides a viral marketing service through a wired/wireless network for data transmission/reception and provides the advertiser's landing page to be included in an iframe that is used to insert a Hypertext Markup Language (HTML) form into another HTML document on a constructed webpage. Accordingly, the service providing server 200 may allow a first user, who is a marketer, to start a rumor of an advertiser's landing page (content) requested by an advertiser, and when content receivers, who are second users, click on the corresponding advertiser's landing page (content) to read the corresponding advertiser's landing page (stay), replay the corresponding advertiser's landing page and view an image, install an application, leave contact information (consultation request), or purchase a product, may distribute some of advertisement costs paid by the advertiser to a marketer who started a rumor of the advertiser's landing page (content). Details thereof will be described with reference to FIG. 8 below.

The marketer terminal 300 is a first user terminal carried by a marketer who participates in viral marketing and selects and spreads an advertiser's landing page by accessing the service providing server 200.

The content receiver terminal 400 is a second user terminal carried by a content receiver who participates in a viral marketing and receives the advertiser's landing page that is spread through the marketer terminal 300 as content.

In the viral marketing service providing system for distributing advertisement costs for each marketer by analyzing a behavior of a content receiver according to the embodiment of the present invention, the service providing server 200 evaluates a traffic quality index of a traffic that is generated by a marketer who starts a rumor of the advertiser's landing page by comprehensively analyzing and evaluating whether a content receiver touches or clicks on a screen, how many seconds a content receiver stays on the landing page, and how many times a content receiver moves from the advertiser's landing page in the iframe to another page, among behaviors of the content receivers who enter the advertiser's landing page according to a rumor from the marketer corresponding to the first user, and distributes advertisement costs for each marketer according to the evaluated traffic quality index.

As shown in FIG. 7, one of user terminals shown in FIG. 6 is defined as a first user terminal 300, and the first user terminal 300 receives an advertisement module including an advertiser's landing page as shown in FIG. 9 from the service providing server 200. Then, the first user terminal 300 starts a rumor and is issued with a virtual Uniform Resource Locator (URL) issued through a first user authentication, becoming an initial rumor spreader.

In this case, the issued virtual URL is spread to the second user terminals 400a to 400n through an SNS or instant messenger service (IMS) that is accessible by the first user terminal 300, and when the virtual URL spread as such is clicked again, an advertisement module is provided from the service providing server 200 to the second user terminals 400a to 400n.

In addition, the second user terminals 400a to 400n having received the virtual URL delivered from the marketer terminal 300 may receive the same advertisement module as the advertisement module provided to the marketer terminal 300 and may perform a second user authentication as in the authentication of the first user to start a rumor of the advertisement module and then may be issued with a second user exclusive virtual URL in which a hierarchy structure is stored, thus becoming an initial rumor starter. As such, when the second users following the first user become the initial rumor starter, the second user may take the position of the first user as described above.

The first user and the second users constitute a hierarchy structure, and a history of the hierarchy structure is stored in the form of a data schema of a virtual URL in a data storage unit, and thus a virtual URL issued to the last $N^{th}$ user stores all records about a previous rumor starter, and the hierarchy structure is read to be used when calculating an advertisement costs later.

Meanwhile, FIG. 8 is a block diagram illustrating the viral marketing service providing system for distributing advertisement costs for each marketer by analyzing a behavior of a content receiver according to the embodiment of the present invention, FIG. 9 is a diagram illustrating a state in which a content receiver terminal is moved to a marketer's landing page after receiving a rumor in the viral marketing service providing system for distributing advertisement costs for each marketer by analyzing a behavior of a content receiver according to the embodiment of the present invention, and FIG. 10 is an example diagram illustrating an analysis on a behavior of a content receiver in the viral marketing service providing system for distributing advertisement costs for each marketer by analyzing a behavior of a content receiver according to the embodiment of the present invention.

Referring to FIGS. 8 to 10, the viral marketing service providing system for distributing advertisement costs for each marketer by analyzing a behavior of a content receiver according to the embodiment of the present invention is a viral marketing service providing system for distributing advertisement costs for each marketer which includes the advertiser terminal 100, the service providing server 200, the marketer terminal 300, and the content receiver terminals 400, i.e., 400a to 400n, and which is configured to transmit and receive various signals or data in a wired or wireless manner in connection with a wired/wireless network.

Here, the service providing server 200 may include an advertisement module generating unit 210, an advertisement module providing unit 220, a user authentication unit 230, a virtual URL issuing unit 240, a content receiver behavior analyzing unit 250, a traffic quality index calculating unit 260, an advertisement cost calculating unit 270, an advertisement cost payment unit 280, and a data storage unit 290, and may further include a rumor spreading degree calculating unit 261 and a rumor influence calculating unit 262.

In the viral marketing service providing system for distributing advertisement costs for each marketer by analyzing a behavior of a content receiver according to the embodiment of the present invention, the service providing server 200 evaluates a traffic quality index of a traffic that is generated by a marketer who starts a rumor of the advertiser's landing page by comprehensively analyzing and evaluating whether a content receiver touches or clicks on a screen, how many seconds a content receiver stays on the landing page, and how many times a content receiver moves from the advertiser's landing page in the iframe to another page among behaviors of the content receivers who enter the advertiser's landing page according to a rumor from the marketer, who is a first user, and distributes advertisement costs for each marketer according to the evaluated traffic quality index.

The advertisement module generating unit 210 of the service providing server 200 generates an advertisement module, and the advertisement module providing unit 220 of the service providing server 200 provides the marketer terminal 300, which is a first user terminal, with the advertisement module including the advertiser's landing page.

The user authentication unit 230 of the service providing server 200 authenticates a first user carrying the marketer terminal 300 as a marketer, and the virtual URL issuing unit 240 issues a virtual URL to the authenticated first user.

The content receiver behavior analyzing unit 250 collectively analyzes and evaluates whether a second user touches or clicks on a screen, how many seconds a second user stays on the landing page, and how many times a second user moves from the advertiser's landing page in the IFRAME to another page, among behaviors of the second users, who are content receivers to be subject to a start of a rumor, in the advertiser's landing page.

The data storage unit 290 of the service providing server 200 records or stores the virtual URL, types of behaviors of the users, and behavior data of the users.

The traffic quality index calculating unit 260 of the service providing server 200 calculates a traffic quality index of the users that corresponds to the behavior of the content receiver evaluated by the content receiver behavior analyzing unit 250 using the types of behaviors and behavior data of the users stored in the data storage unit 290.

In addition, the rumor spreading degree calculating unit 261 calculates the degree of rumor spreading by extracting the number of times in which marketers, who are the first users, start a rumor with regard to a rumor starting function, and in this case, the degree of rumor spreading is obtained by dividing the total number of clicks by the number of times in which the first user starts a rumor. In addition, the rumor influence calculating unit 262 of the service providing server 200 calculates an influence of a rumor of a corresponding user using the traffic quality index and the degree of rumor spreading.

The advertisement cost calculating unit 270 of the service providing server 200 calculates advertisement cost distribution rates for each marketer according to the traffic quality index calculated by the traffic quality index calculating unit 260, and the advertisement cost payment unit 280 pays advertisement costs for each marketer according to the advertisement cost distribution rates calculated by the advertisement cost calculating unit 270. Accordingly, the advertisement cost calculating unit 270 may extract a high quality marketer who generates an active behavior in an advertiser's landing page or starts a rumor of content in a way that aids in an advertising purpose of an advertiser using the traffic quality index evaluated by the traffic quality index calculating unit 260 and distribute some of advertisement costs paid by the advertiser to the high quality marketer at a higher rate than other marketers.

In more detail, referring again to FIG. 8, the marketer terminal 300 and the content receiver terminal 400 are user terminals capable of accessing the service providing server 200, and although illustrated as a wireless terminal or a cellular phone, may be implemented as all types of computer or mobile devices that are used by users, and any type of hardware capable of inputting, retrieving and displaying information through wired/wireless communication without limitation. In addition, the user terminals 300 and 400 are basically provided with software for operating the device, and an access to the service providing server 200 is made using the user terminal.

In addition, as for the user terminals 300 and 400, considering the increasing use of wireless terminals or smart phones as a mobile phone, the user terminals for implementing the functions, which will be described below, may be provided using smart phones in which suitable applications or programs are installed.

The service providing server 200 serves to connect the advertiser server 100 and the users terminals, including the marketer terminal 300 and the content receiver terminal 400, allow the advertiser and the user to sign up for a membership as an advertisement provider and for a membership as an advertisement consumer, and provide the user terminal with a landing page regarding an advertisement provided by the advertiser, together with an advertisement module.

In detail, as shown in FIG. 8, the advertisement module generating unit 210 and the advertisement module providing unit 220 of the service providing server 200 generate the advertisement module and provide the marketer terminal 300 or content receiver terminal 400, which is a user terminal, with the generated advertisement module as an entire page, or may allow the generated advertisement module to be located on a part of the user terminal. The advertisement module may be proved in various shapes, such as a polygonal- or a circular-shaped button or a bar or layer shape surrounding the advertiser's landing page.

The advertisement module may include not only the landing page having contents which are desired to be advertised, but also functions required to provide a viral marketing service according to the embodiment of the present invention.

The advertisement module generated through the advertisement module generating unit 210 includes the advertiser's landing page and performs a rumor starting function through a rumor starting button. Here, the rumor starting function represents performing viral marketing in the form of word of mouth and represents a function used by clicking on an additional rumor starting button or an additional menu in the advertiser's landing page or.

For example, the rumor starting function allows a rumor to be spread in the form of word of mouth between acquaintances of the user in association with an SNS or IMS, or allows a user to spread a rumor to acquaintances using a virtual URL which will be described below. For example, as shown in FIG. 9, the content receiver terminal 400, corresponding to a second user terminal, may receive a rumor and move to a landing page 500 of a marketer.

As described above, the advertisement module may be provided on a part of a screen of the marketer terminal 300 or content receiver terminal 400, which is a user terminal, together with the advertiser's landing page in the form of an additional button to be clickable, a bar, or a layer surrounding the advertiser's landing page. Alternatively, the advertisement module may be embedded in the marketer terminal 300 or the content receiver terminal 400 in a size or form inoperable by a user.

In addition, the advertisement module, when clicked by a user, may be converted to a rumor starting page that is displayed on the screen of the marketer terminal 300 or content receiver terminal 400, which is a user terminal, or when clicked again, may be converted to the screen including the advertisement landing page.

The rumor starting function included in the advertisement module may be used through a clickable button or a menu that is provided by the advertisement module, and for example, as shown in FIG. 7, the rumor starting function may be executed in association with an SNS or IMS, or through a virtual URL.

Referring again to FIG. 8, the user authentication unit 230 is provided to authenticate a user who desires to perform viral marketing through the advertisement module, and by authenticating the user, identifies a valid behavior of the user who participates in the viral marketing service according to the embodiment of the present invention and allows the data identified as such to be used as reference data about distributing advertisement cost.

In addition, the authentication of a user may be performed in two ways. For example, one way is to sign up for a membership in a service providing company and perform an authentication through a membership login, and the other way is to authenticate a user, who is a nonmember, through a mobile phone authentication.

As described above, the viral marketing service according to the embodiment of the present invention may be implemented using a virtual URL, and the virtual URL has a structure including three pieces of data "random address value," "actual URL," and "user information."

In detail, the "random address value" is generated when a virtual URL is issued, and when the virtual URL is generated as "http://qping.kr/q/Oy34apP," a part of the combination of alphabets and numbers at the end of the virtual URL "Oy34apP" is the random address value. Next, the "actual URL" is an actual homepage address of an advertisement landing page of an advertiser. For example, when an actual homepage address of a product such as a Galaxy S5 made by Samsung Electronics Co. is "http://www.samsung.com/sec/galaxys5," a URL link of the address is the "actual URL." Finally, the "user information" refers to various types of personal information data of a user authenticated using one of the above described two types of user authentication methods.

However, the "actual URL" having a long length, as in the address of the Galaxy S5, is not suitable for being used in an SNS or IMS, and a virtual URL including all data required for the viral marketing service according to the embodiment of the present invention despite of a short length is preferable for use. In other words, the virtual URL is referred to as a short URL, and a tiny URL also may be used as a virtual URL.

Such a virtual URL is issued to an authenticated user by the virtual URL issuing unit 240, and, for example, when authenticated first and second users are issued with virtual URLs through a rumor starting function, the virtual URL issued to the second user who has been recommended includes information about the first user who has recommended. Such a form constitutes a hierarchy structure as the number of recommended users increases, and has a data schema form in which pieces of information about previously recommending users are sequentially restored in "user information" to be included in a virtual URL of a recommended user.

The virtual URL issuing unit 240 has the three types of data of virtual URL as described above, and while issuing a virtual URL to a corresponding user, records or stores the virtual URL in the data storage unit 290 including a database. The virtual URL stored as such is used to allocate a higher distribution rate to a user having a higher priority, such as a first user, by identifying the hierarchy structure between users.

The data storage unit 290 including the database is mostly provided with a storage space in the service providing server 200, but may be provided with a storage module outside the service providing server 200.

In general, in the viral marketing service according to the embodiment of the present invention, a marketer, who is a first user, serves to spread advertisement contents through a rumor, and a content receiver (content audience), who is a second user having received the advertisement contents, behaves in a way desired by the advertiser, and the marketer and the content receiver are each provided with a user terminal described above.

In this case, the marketer, who is the first user, is a user issued with a virtual URL from the service providing server 200 first and may start a rumor of the virtual URL through various SNSs or IMSs together with a short advertisement phrase, if necessary, and other users having received the rumor from the marketer terminal 300 carried by the marketer, who is the first user, become second users.

When one of the second users clicks on the virtual URL sent by the first user, the virtual URL provides an advertisement module, which is generated through the advertisement module generating unit 210, to the user having clicked on the virtual URL through the advertisement module providing unit 220, and the user having clicked on the virtual URL sent by the first user conducts various behaviors in the advertisement module on the landing page provided by the advertiser. In this case, the content receiver behavior analyzing unit 250 may extract a total number of clicks among the behaviors of the second users. The total number of clicks refers to the sum of the number of times in which the second users click on the virtual URL sent by the first user to open the advertiser's landing page. The determined total number of clicks and the data analyzed in the content receiver behavior analyzing unit 250 are separately recorded or stored in the data storage unit 290 and are used for calculation of a traffic quality index at a later time.

In detail, the content receiver behavior analyzing unit 250 of the service providing server 200 comprehensively analyzes and evaluates whether a second user touches or clicks on a screen, how many seconds a second user stays on the corresponding landing page, and how many times a second user moves from the advertiser's landing page in the iframe to another page among the behaviors of the second users, who are content receivers to be subjected to the starting of the rumor, on the advertiser's landing page. For example, drawing FIG. 10A illustrates analyzing a touch in a landing page on the content receiver terminal, FIG. 10B illustrates analyzing a scroll in a landing page on the content receiver terminal, FIG. 10C illustrates analyzing a duration time in a landing page on the content receiver terminal, and FIG. 10D illustrates analyzing the number of times in which src is used in a landing page on the content receiver terminal.

Meanwhile, the marketer, who is the first user, starting the rumor first triggers a click from the second users by delivering the virtual URL issued from the service providing server 200 to the content receivers, who are the second users. Advertisement costs distributed in this process are paid to the marketers through the advertisement cost payment unit 280.

In addition to the traffic quality index, "the degree of rumor spreading" index and "the influence of a rumor" index may be calculated through the rumor spreading degree calculating unit 261 and the rumor influence calculating unit 262, respectively. In this case, "the degree of rumor spreading" is an index for identifying the degree to which a rumor started by a user, and is obtained by dividing the total number of clicks of second users extracted as above by the number of times in which a user participating in viral marketing starts a rumor.

For example, when a first user starts a rumor ten times through various SNSs or messengers, and second users having received the rumor from the first user perform clicks twenty times in total, the rumor started by the first user has a degree of rumor spreading of "2," and it is considered that twenty instances of clicking are triggered through ten instances of starting a rumor.

Meanwhile, when a second user starts a rumor twenty times through various SNSs or messengers, and third users having received the rumor from the second user perform clicks twenty times in total, which is equal to that in the previous case, the rumor started by the second user has a degree of rumor spreading of "1," and it is considered that the degree to which the rumor of the second user leads to an actual click is weaker than that of the first user despite a larger number of instances of starting a rumor. In other words, it can be seen that the second user has a lower level of contribution to rumor spreading than that of the first user.

The degree of rumor spreading of the user is defined as "(the degree of rumor spreading)=(total number of clicks)/(the number of times a corresponding user starts a rumor)." When "the traffic quality index" and "the degree of rumor spreading" are high, the influence of the rumor started by the corresponding user is naturally determined to be great. For example, "the influence of a rumor" is obtained by multiplying "the traffic quality index" by "the degree of rumor spreading."

The influence of the rumor calculated as such is extracted for each marketer and written as a list such that the list is viewed from the service providing server 200 upon request of the advertiser.

In addition, in calculating the advertisement costs, "the degree of rumor spreading" and "the influence of the rumor" may be considered together with "the traffic quality index", and considering the three indexes, advertisement costs are distributed and paid to marketers through the advertisement cost payment unit 280. For example, the advertisement cost calculating unit 270 may extract a high quality marketer who generates an active behavior in an advertiser's landing page or starts a rumor of content in a way that aids in an advertising purpose of an advertiser using the traffic quality index evaluated by the traffic quality index calculating unit 260 and distribute some of advertisement costs paid by the advertiser to the high quality marketer at a higher rate than other marketers.

With the viral marketing service providing system for distributing advertisement costs for each marketer by analyzing a behavior of a content receiver according to the embodiment of the present invention, the service providing server 200 may filter out an abusing marketer (an abuser) who has a behavior of loading the advertiser's landing page in a mechanically repeating manner or triggering a click using a title that is not related to the purpose of the advertiser's advertisement to degrade the advertising effect using the evaluated traffic quality index. In addition, the service providing server 200 may extract a high quality marketer who generates an active behavior in an advertiser's landing page or starts a rumor of content in a way that aids in an advertising purpose of an advertiser using the evaluated traffic quality index and distribute some of advertisement costs paid by the advertiser to the high quality marketer at a higher rate than other marketers.

[Viral Marketing Service Providing Method for Distributing Advertisement Costs for Each Marketer]

FIG. 11 is an operation flowchart showing a viral marketing service providing method for distributing advertisement costs for each marketer by analyzing a behavior of a content receiver according to an embodiment of the present invention.

Referring to FIG. 11, the viral marketing service providing method for distributing advertisement costs for each marketer by analyzing a behavior of a content receiver according to an embodiment of the present invention includes generating, by the service providing server 200, an advertisement module including an advertiser's landing page (S110). The advertisement module, while maintaining a button shape or bar shape, may be converted to a rumor starting page by being clicked, and vice versa. The advertisement module includes a rumor starting function related to viral marketing in the form of word of mouth. In addition, the rumor starting function is used through an additional button or menu on the advertisement module and allows a rumor to be started in association with an SNS or IMS or through a virtual URL.

Then, the service providing server 200 provides the marketer terminal 300, which is the first user terminal, with the advertisement module including the advertiser's landing page (S120). In this case, the advertisement module including the advertiser's landing page may be provided as an advertisement list on the webpage, and a touch input for selecting the advertisement list or a button click input of clicking on a button for a rumor starting function and clicking on a button for spreading a virtual URL after selecting an SNS or messenger corresponds to an initial step input or an intermediate step input for transferring data to the next step, and the touch input or the button click input corresponds to a mechanical input behavior regardless of a determination of a user.

Then, the service providing server 200 authenticates the first user carrying the marketer terminal 300 as a marketer (S130). In this case, the authentication of the user may be performed through a membership login, or a non-membership login using a mobile phone authentication.

Then, the service providing server 200 issues a virtual URL to the authenticated marketer terminal 300 (S140). In this case, the virtual URL includes a short URL or a tiny URL. The issued virtual URL is stored and includes an address of an advertiser's landing page and hierarchy structure information according to recommendation of users. Accordingly, the virtual URL is spread to second users for whom the first user starts a rumor such that a click of the second users is induced. In this case, the virtual URL including the hierarchy structure of the first and second users may be stored in the data storage unit 290.

Then, the marketer terminal 300 spreads the advertisement module including the landing page to the content receiver terminal 400 through a rumor spreading (S150).

Then, the service providing server 200 analyzes the behavior of a content receiver in the landing page of the content receiver terminal 400 (S160). In this case, the service providing server 200 comprehensively analyzes and evaluates whether a content receiver touches or clicks on a screen, how many seconds a content receiver stays on the corresponding landing page, and how many times a content receiver moves from the advertiser's landing page in the iframe to another page among the behaviors of the content receivers who have entered the advertiser's landing page according to the rumor started by the marketer, who is the first user.

Then, data corresponding to the behavior of the content receiver is stored in the data storage unit (S170). That is, the virtual URL, and the types of behaviors and behavior data of the users are stored in the data storage unit 290, including the database, and the data storage unit 290 may be provided inside or outside the service providing server.

Then, the service providing server 200 calculates a traffic quality index of a traffic generated by the marketer who has started a rumor of the advertiser's landing page according to the behavior of the content receiver (S180).

Then, the service providing server 200 calculates advertisement costs in consideration of the traffic quality index (S190). In this case, it is preferable to extract a high quality marketer who generates an active behavior in the advertiser's landing page or starts a rumor of contents in a manner which aids in the advertising purpose of the advertiser using the traffic quality index and to distribute some of advertisement costs paid by the advertiser to the high quality marketer at a higher rate than other marketers.

Then, the calculated advertisement costs are paid to the marketers who have started a rumor (S200).

The viral marketing service providing method for distributing advertisement costs for each marketer by analyzing a behavior of a content receiver according to the embodiment of the present invention may further include calculating the degree of rumor spreading by extracting the number of times in which marketers, who are the first users, start a rumor with regard to a rumor starting function. The degree of rumor spreading may be obtained by dividing the total number of clicks by the number of times in which the first user starts a rumor. In addition, the viral marketing service providing method for distributing advertisement costs for each marketer by analyzing a behavior of a content receiver according to the embodiment of the present invention may further include calculating an influence of a rumor started by a corresponding user using the traffic quality index and the degree of rumor spreading.

According to the embodiment of the present invention, an abusing marketer (abuser) can be filtered out and thus damage to legitimate marketers can be minimized in distributing predetermined advertisement costs by having the content receiver behavior analyzing unit and the traffic quality index calculating unit. In addition, a high quality marketer who generates an active behavior in the advertiser's landing page or starts a rumor of contents in a manner which aids in the advertising purpose of the advertiser is extracted using a traffic quality index and some of advertisement costs paid by the advertiser can be distributed to the high quality marketer at a higher rate than other marketers.

The viral marketing service providing method for distributing advertisement costs for each marketer by analyzing a behavior of a content receiver according to an embodiment of the present invention may be implemented in the form of program instructions readable by a computer and stored in a recording medium readable by a computer, and the computer readable recording medium includes all types of recording devices for storing data that may be read by a computer system. The program instructions recorded or stored in the recording media may be specially designed and constructed for the present invention, or may be well known and available to those of ordinary skill in the field of computer software. In addition, the computer-readable recording medium may also be distributed over network-coupled computer systems so that the computer-readable code is stored and executed in a distributed fashion. The program instruction may include not only a machine language code made by a compiler but also a high-level language code executable by a device that may electronically process information through an interpreter and the like, for example, by a computer.

The described hardware devices may be configured to act as one or more software modules in order to perform the operations of the present invention, or vice versa.

The exemplary embodiments of the present invention are for illustrative purposes, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention is set forth in the following claims rather than the above specification, and it is intended that the present invention covers all modifications provided they fall within the scope of the appended claims and their equivalents.

The invention claimed is:

1. A viral marketing service providing system for distributing advertisement fee to each marketer by analyzing behaviors of a plurality of content receivers, the viral marketing service providing system comprising:

an advertiser server configured to provide an advertiser's landing page as content;

a service providing server configured to provide a viral marketing service through a wireless/wired network for data transmission and reception and provide the advertiser's landing page to be included in an iframe on a constructed web page;

a marketer terminal corresponding to a first user terminal carried by a marketer who participates in the viral marketing and configured to select and spread the advertiser's landing page by accessing the service providing server; and a plurality of content receiver terminals corresponding to a plurality of second user terminals carried by the content receivers who participate in the viral marketing and configured to receive the advertiser's landing page spread through the marketer terminal as content, wherein the service providing server is configured to generate an advertisement module including the advertiser's landing page, authenticate a first user carrying the marketer terminal with the generated advertiser's landing page as the marketer after the first user initiated a rumor starting, determine a traffic quality index of traffic generated by the marketer who started the rumor of the advertiser's landing page by analyzing and evaluating behaviors of each of the content receivers who enter the advertiser's landing page, and to distribute advertisement costs for each marketer according to the traffic quality index, wherein the analyzed behaviors of each of the content receivers include detected touches or clicks on a screen of the content receiver, the amount of time the content receiver stays on the landing page, and the number of times the content receiver moves from the advertiser's landing page in the iframe to another page, and wherein the service providing server uses the traffic quality index to filter out an abusing marketer who has a behavior of loading the advertiser's landing page in a mechanically repeating manner or triggering a click using a title that is not related to the purpose of the advertiser's advertisement, calculates advertisement costs for each marketer according to the traffic quality index, and pays the calculated advertisement costs to each marketer having started rumors.

2. The viral marketing service providing system of claim 1, wherein the service providing server further comprises:

a virtual Uniform Resource Locator (URL) issuing unit configured to issue a virtual URL to the authenticated first user, wherein the virtual URL has a structure including three pieces of data, namely "random address value," "actual URL," and "user information", in which the "random address value" is an alphanumerical combination at the end of the virtual URL, the "actual URL" is an actual homepage address of the advertiser's landing page, and the "user information" refers to personal information data of the marketer, and the virtual URL is spread to the plurality of content receiver terminals by the marketer terminal;

a content receiver behavior analyzing unit configured to comprehensively analyze and evaluate, among behaviors of second users who are content receivers to be subject to a start of a rumor in the advertiser's landing page, whether the second user touches or clicks on a screen, how many seconds the second user stays on the landing page, and how many times the second user moves from the advertiser's landing page in the iframe to another page;

a data storage unit configured to record or store the virtual URL, types of behaviors of the users, and behavior data of the users;

a traffic quality index calculating unit configured to calculate a traffic quality index of the users that corresponds to the behaviors of the content receivers evaluated by the content receiver behavior analyzing unit using the types of behaviors and behavior data of the users stored in the data storage unit;

an advertisement cost calculating unit configured to calculate advertisement cost distribution rates for each marketer according to the traffic quality index calculated by the traffic quality index calculating unit; and an advertisement cost payment unit configured to pay the advertisement costs for each marketer according to the advertisement cost distribution rates calculated by the advertisement cost calculating unit.

3. The viral marketing service providing system of claim 2, wherein the service providing server further comprises a rumor spreading degree calculating unit configured to calculate a degree of rumor spreading by extracting a number of times in which marketers, who are the first users, start a rumor with regard to a rumor stating function, wherein the degree of rumor spreading is obtained by dividing a total number of clicks by a number of times in which the first user starts a rumor.

4. The viral marketing service providing system of claim 3, wherein the service providing server further comprises an influence calculating unit configured to calculate an influence of a rumor of a corresponding user using the traffic quality index and the degree of rumor spreading.

5. The viral marketing service providing system of claim 2, wherein the advertisement module, while maintaining a button shape or a bar shape, is converted to a rumor starting page by being clicked on, and vice versa, wherein the advertisement module includes a rumor starting function related to a viral marketing in a form of word of mouth.

6. The viral marketing service providing system of claim 5, wherein the rumor starting function is performable through an additional button or menu on the advertisement module and allows a rumor to be started in association with a social network service (SNS) or an instant messenger service (IMS) or through the virtual URL.

7. The viral marketing service providing system of claim 2, wherein the virtual URL includes a short URL or a tiny URL.

8. The viral marketing service providing system of claim 7, wherein the virtual URL, after being issued, is stored in the data storage unit and includes an address of an advertiser's landing page and a hierarchical structure according to recommendations of users.

9. The viral marketing service providing system of claim 2, wherein the data storage unit includes a database, and the database is constructed inside the service providing server or outside the service providing server.

10. The viral marketing service providing system of claim 2, wherein the advertisement cost calculating unit extracts a high quality marketer who generates an active behavior in an advertiser's landing page or starts a rumor of content in a way that aids in an advertising purpose of an advertiser using the traffic quality index evaluated by the traffic quality index calculating unit and distributes some of advertisement costs paid by the advertiser to the high quality marketer at a higher rate than other marketers.

11. A viral marketing service providing method for distributing advertisement fee to each marketer by analyzing behaviors of content receivers, the viral marketing service providing method comprising the steps of:

a) generating, by a service providing server, an advertisement module including an advertiser's landing page;

b) authenticating, by the service providing server, a first user carrying a marketer terminal as a marketer after the first user initiated a rumor starting, wherein the marketer terminal is a first user terminal with the generated advertiser's landing page;

c) issuing, by the service providing server, a virtual Uniform Resource Locator (URL) to the authenticated marketer terminal, wherein the virtual URL has a structure including three pieces of data, namely "random address value," "actual URL," and "user information", in which the "random address value" is an alphanumerical combination at the end of the virtual URL, the "actual URL" is an actual homepage address of the advertisement landing page, and the "user information" refers to personal information data of the first user authenticated as a marketer;

d) spreading, by the marketer terminal, the issued virtual URL for the advertisement module including the landing page to a content receiver terminal through the rumor starting;

e) analyzing and evaluating, by the service providing server, the behavior of each of the content receivers who enter the landing page of the content receiver terminal, wherein the analyzed behavior of each of the content receivers include detected touches or clicks on a screen of the content receiver, the amount of time the content receiver stays on the landing page, and the number of times the content receiver moves from the advertiser's landing page in the iframe to another page;

f) storing data corresponding to the behaviors of the content receivers in a data storage unit;

g) calculating, by the service providing server, a traffic quality index representing a traffic generated by the marketer who has started a rumor of the advertiser's landing page by using the evaluated behavior of each of the content receivers, and using the traffic quality index to filter out an abusing marketer who has a behavior of loading the advertiser's landing page in a mechanically repeating manner or triggering a click using a title that is not related to the purpose of the advertiser's advertisement;

h) calculating, by the service providing server, an advertisement cost according to the traffic quality index; and i) paying the calculated advertisement costs to marketers having started rumors.

12. The viral marketing service providing method of claim 11, further comprising calculating a degree of rumor spreading by extracting a number of times in which marketers, who are the first users, start a rumor with regard to a rumor stating function, wherein the degree of rumor spreading is obtained by dividing a total number of clicks by a number of times which the first user starts a rumor.

13. The viral marketing service providing method of claim 12, further comprising calculating an influence of a rumor of a corresponding user using the traffic quality index and the degree of rumor spreading.

14. The viral marketing service providing method of claim 11, wherein the advertisement module in the step a), while maintaining a button shape or a bar shape, is converted to a rumor starting page by being clicked on, and vice versa, wherein the advertisement module includes a rumor starting function related to viral marketing in a form of word of mouth.

15. The viral marketing service providing method of claim 14, wherein the rumor starting function is performable through an additional button or menu on the advertisement module and allows a rumor to be started in association with a social network service (SNS) or an instant messenger service (IMS) or through the virtual URL.

16. The viral marketing service providing method of claim 11, wherein the authentication of the user in the step b) is performed through a membership login, or a non-membership login using a mobile phone authentication.

17. The viral marketing service providing method of claim 11, wherein the virtual URL in the step c) includes a short URL or a tiny URL.

18. The viral marketing service providing method of claim 17, wherein the virtual URL, after being issued, is stored and includes an address of an advertiser's landing page and a hierarchical structure according to recommendations of users.

19. The viral marketing service providing method of claim 11, wherein the virtual URL, types of behaviors of the users, and behavior data of the users in the step f) are recorded and stored in a data storage unit such as a database, and the data storage unit is located inside the service providing server or outside the service providing server.

20. The viral marketing service providing method of claim 11, wherein in the step h), a high quality marketer who generates an active behavior in the advertiser's landing page or starts a rumor of content in a way that aids in an advertising purpose of the advertiser is extracted using the traffic quality index in the step g), and some of advertisement costs paid by the advertiser are distributed to the high quality marketer at a higher rate than other marketers.

* * * * *